United States Patent
Campagna et al.

(10) Patent No.: US 7,328,995 B2
(45) Date of Patent: Feb. 12, 2008

(54) METHOD AND APPARATUS FOR EMBEDDING INFORMATION IN AN IMAGE

(75) Inventors: Matthew J. Campagna, Ridgefield, CT (US); Robert A. Cordery, Danbury, CT (US); Easwaran Nambudiri, Rye Brook, NY (US); Luis A. Sanchez, Hamden, CT (US); Gary G. Hansen, Newtown, CT (US)

(73) Assignee: Pitney Bowes Inc., Stamford, CT (US)

( * ) Notice: Subject to any disclaimer, the term of this patent is extended or adjusted under 35 U.S.C. 154(b) by 622 days.

(21) Appl. No.: 11/020,297

(22) Filed: Dec. 23, 2004

(65) Prior Publication Data

US 2006/0139381 A1    Jun. 29, 2006

(51) Int. Cl.
- B41J 2/01 (2006.01)
- B42D 15/00 (2006.01)
- G07B 17/02 (2006.01)

(52) U.S. Cl. .......................... 347/107; 283/73; 283/901; 283/902; 705/408

(58) Field of Classification Search ................ 347/107; 283/73, 901, 902; 705/408
See application file for complete search history.

(56) References Cited

U.S. PATENT DOCUMENTS

| | | | |
|---|---|---|---|
| 4,351,547 A | * | 9/1982 | Brooks, II .................... 283/93 |
| 4,829,568 A | * | 5/1989 | Clark et al. .................... 705/62 |
| 5,436,974 A | * | 7/1995 | Kovanen ...................... 380/51 |
| 5,513,563 A | | 5/1996 | Berson |
| 6,334,678 B1 | | 1/2002 | Daigneault et al. |

FOREIGN PATENT DOCUMENTS

EP    0705022 A2    4/1996

OTHER PUBLICATIONS

Watermarking Music Sheets while Printing, M. Monsignori, P. Nesi, M.B. Spinu, Proceedings of the First International Conference on WEB Delivering of Music, 2001.

* cited by examiner

*Primary Examiner*—Julian D. Huffman
(74) *Attorney, Agent, or Firm*—Brian A. Lemm; Angelo N. Chaclas

(57) ABSTRACT

A method and apparatus for embedding information in an image during relative movement between a print medium and an ink jet print head is provided. A plurality of first lines are printed and a plurality of second lines are printed. Each of the first lines includes a plurality of first dots and a plurality of second dots offset from the first dots by a first amount, and each of the second lines includes a plurality of third dots and a plurality of fourth dots offset from the third dots by a second amount different than the first amount. The information is encoded in the image using an encoding scheme in which the first lines represent a first value in the encoding scheme and the second lines represent a second value in the encoding scheme.

20 Claims, 5 Drawing Sheets

METHOD AND APPARATUS FOR EMBEDDING INFORMATION IN AN IMAGE

FIELD OF THE INVENTION

The present invention relates to a method and apparatus for embedding information in an image, and, in particular, to a method and apparatus for embedding information in an image, such as a postal indicium, created by an ink jet print head to, for example, facilitate copy detection and prevent fraud.

BACKGROUND OF THE INVENTION

Mail processing systems, such as, for example, a mailing machine, often include different modules that automate the processes of producing mail pieces. The typical mailing machine includes a variety of different modules or subsystems, each of which performs a different task on the mail piece. The mail piece is conveyed downstream utilizing a transport mechanism, such as rollers or a belt, to each of the modules. Such modules could include, for example, a singulating module for separating a stack of mail pieces such that the mail pieces are conveyed one at a time along the transport path, a stripping/moistening module for stripping open the flap of an envelope and wetting and sealing the glued flap of an envelope, a weighing module for weighing the mail piece, and a metering/printing module for storing postage amounts and applying evidence of postage either directly to the mail piece or to a tape to be applied to the mail piece. The mailing machine is controlled by a central processing unit that executes software stored in memory provided in the mailing machine. The exact configuration of the mailing machine is, of course, particular to the needs of the user.

The metering/printing modules of many current mailing machines utilize ink jet printing technology to print evidence of postage, such as postal indicia that include a 2-D barcode. Ink jet printers are well known in the art. Generally, an ink jet printer includes one or more arrays of nozzles (sometimes referred to as orifices), a supply of ink, a plurality of ejection elements (for example, heater elements or piezoelectric transducer elements) corresponding to the nozzles and suitable driver and control electronics for controlling the ejection elements. Typically, the one or more arrays of nozzles and the ejection elements along with their associated components are referred to as a print head. It is the activation of the ejection elements that causes drops of ink to be expelled from the nozzles. The ink ejected in this manner forms drops which travel along a flight path until they reach a print medium such as a sheet of paper, an envelope or the like. Once they reach the print medium, the drops dry and collectively form a print image. Typically, the ejection elements are selectively activated (energized) or not activated (not energized) to expel or not expel, respectively, drops of ink as relative movement is provided between the print head and the print medium so that a predetermined or desired print image is achieved.

The transport mechanism of a mailing machine also typically includes an encoder system that acts as a mechanical timer for generating firing pulses for the print head and thus synchronizing the printing operation with the motion of the mail pieces. One example of an encoder system includes an encoder disk that has a plurality of apertures located around its circumference, a light source and a light detector. As the transport mechanism conveys mail pieces along the mailing machine, it causes the encoder disk to rotate. The encoder disk, the light source and the encoder detector are positioned with respect to one another so that the encoder disk causes the light source to be alternately blocked and unblocked as the encoder disk rotates. The transition from blocked to unblocked or vice versa provides a synchronization signal for timing of print head firing pulses. Thus, as will be appreciated, the timing of the printing by the print head is tied to the movement of the mail pieces.

As noted above, images such as postal indicia are printed by metering/printing modules of mailing machines to evidence that accounting has occurred for the appropriate postage for the mail piece. A typical postal indicium includes fixed elements such as city name, state, a graphic, meter serial number, etc., and variable information such as date, postage amount, an encrypted number, etc. Postal indicia have been printed by flat bed printers, rotary printers and ink jet printers. The improvement of photocopying, printing and scanning equipment over time has made it easier to commit fraud by copying and reusing postal indicia.

The possibility of fraud also exists in many other printing applications. For example, ticketing companies are currently giving purchasers the option of printing their electronic tickets at home, using ordinary paper, a personal computer printer, and an Internet connection. One of the problems in allowing people to print tickets at home is how to ensure that the tickets are not counterfeited. One of the solutions suggested to solve the foregoing problem is to print an encrypted bar code on the ticket. Unfortunately, a ticket printed on ordinary paper with an encrypted bar code can be photocopied, thereby making it difficult to distinguish between the original, genuine ticket and a photocopied ticket.

One method currently used to deter copying of images such as postal indicia is to use specialty inks, such as specialty tagged fluorescent inks. However, a counterfeiter could obtain a specialty ink and use it with an off-the-shelf printer. Further, as many printing applications that require security are moving to the use of conventional black ink, this method obviously would not be available to prevent fraud. Thus, there is a need for a method for deterring copying and preventing fraud that is independent of the use of a specialty ink.

SUMMARY OF THE INVENTION

The present invention relates to a method of embedding information in an image that is printed on a print medium using an ink jet print head during relative movement between the print medium and the ink jet print head along a horizontal axis (e.g., by moving either or both of the print medium and the ink jet print head). The method includes steps of printing a plurality of first vertical lines and printing a plurality of second vertical lines. Each of the first vertical lines includes a plurality of first dots and a plurality of second dots offset from the first dots along the horizontal axis by a first amount, and each of the second vertical lines includes a plurality of third dots and a plurality of fourth dots offset from the third dots along the horizontal axis by a second amount different than the first amount. The information is encoded in the image using an encoding scheme in which the first vertical lines represent a first value in the encoding scheme and the second vertical lines represent a second value in the encoding scheme. The method may further include printing a plurality of third vertical lines, each of the third vertical lines including a plurality of fifth dots and a plurality of sixth dots offset from the fifth dots along the horizontal axis by a third amount that is different than the first and second amounts. In this case, the third vertical lines represent a third value in the encoding scheme.

The invention also relates to an apparatus for embedding information in an image printed on a print medium including an ink jet print head for printing the image during relative movement between the print medium and the ink jet print head along a horizontal axis, a processor, and a memory. The memory stores software executable by the processor that includes instructions for printing a plurality of first vertical lines, each of which include a plurality of first dots and a plurality of second dots offset from the first dots along the horizontal axis by a first amount, and for printing a plurality of second vertical lines, each of which include a plurality of third dots and a plurality of fourth dots offset from the third dots along the horizontal axis by a second amount different than the first amount. The information is encoded in the image using an encoding scheme in which the first vertical lines represent a first value in the encoding scheme and the second vertical lines represent a second value in the encoding scheme. The instructions may further comprise instructions for printing a plurality of third vertical lines, each of which include a plurality of fifth dots and a plurality of sixth dots offset from the fifth dots along the horizontal axis by a third amount different than the first and second amounts. In this case, the third vertical lines represent a third value in the encoding scheme. The ink jet print head may include a first array of vertically oriented first nozzles and a second array of vertically oriented second nozzles, wherein the first and third dots are printed using a plurality of the first nozzles and the second and fourth dots are printed using a plurality of the second nozzles.

In either the method or the apparatus, the first amount may be zero such that the first vertical lines are straight lines and the second vertical lines contain offset dots. Alternatively, the first and second lines may both contain offset dots, with the dots being offset to a different degree according to the type of line.

The encoding scheme is, in one embodiment, a binary encoding scheme wherein the first vertical lines represent 0s and the second vertical lines represent 1s. Alternatively, the encoding scheme may be a binary encoding scheme and wherein the first vertical lines represent 1s and the second vertical lines represent 0s.

The method and apparatus may be utilized in connection with the printing of postage, in which case the print medium comprises a mailpiece and the image comprises a postal indicium.

Therefore, it should now be apparent that the invention substantially achieves all the above aspects and advantages. Additional aspects and advantages of the invention will be set forth in the description that follows, and in part will be obvious from the description, or may be learned by practice of the invention. Moreover, the aspects and advantages of the invention may be realized and obtained by means of the instrumentalities and combinations particularly pointed out in the appended claims.

BRIEF DESCRIPTION OF THE DRAWINGS

The accompanying drawings illustrate presently preferred embodiments of the invention, and together with the general description given above and the detailed description given below, serve to explain the principles of the invention. As shown throughout the drawings, like reference numerals designate like or corresponding parts.

DETAILED DESCRIPTION OF THE PREFERRED EMBODIMENTS

Figure 1:
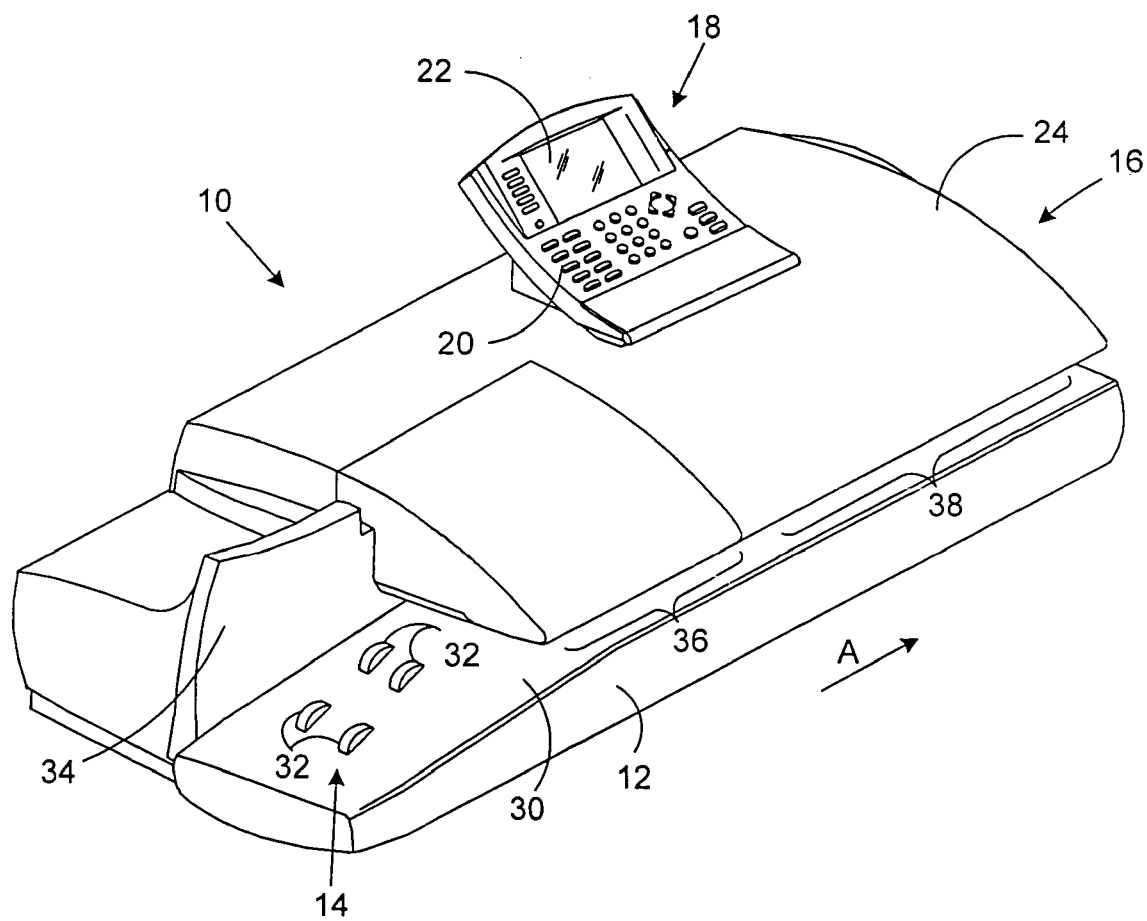
FIG. 1 is an isometric view of a mail processing system in which embodiments of the present invention can be utilized.

Referring to FIG. 1, an isometric view of a mail processing system 10, such as a mailing machine, in which embodiments of the present invention may be utilized. Mailing processing system 10 comprises a base unit, designated generally by the reference numeral 12, the base unit 12 having a mail piece input end, designated generally by the reference numeral 14, and a mail piece output end, designated generally by the reference numeral 16. A control panel 18 is fixedly mounted on the base unit 12, and includes one or more input/output devices, such as, for example, a keyboard 20 and a display device 22. One or more cover members 24 are pivotally mounted on the base 12 so as to move from the closed position shown in FIG. 1 to an open position (not shown) so as to expose various operating components and parts for service and/or repair as needed.

The base unit 12 further includes a horizontal feed deck 30 that extends substantially from the input end 14 to the output end 16. A plurality of nudger rollers 32 are suitably mounted under the feed deck 30 and project upwardly through openings in the feed deck so that the periphery of the rollers 32 is slightly above the upper surface of the feed deck 30 and can exert a forward feeding force on a succession of mail pieces placed in the input end 14. A wall 34 defines a mail piece stacking location from which the mail pieces are fed by the nudger rollers 32 along the feed deck 30 and into a transport mechanism (not shown) that transports the mail pieces in a downstream path of travel along a horizontal axis, as indicated by arrow A, through one or more modules, such as, for example, a separator module and moistening/sealing module. Each of these modules is located generally in the area indicated by reference numeral 36. The mail pieces are then passed to a metering/printing module (including print head controller 44 and ink jet print head 46 shown in FIG. 2) located generally in the area indicated by reference numeral 38, and exit the mailing processing system 10 at the output end 16.

Figure 2:
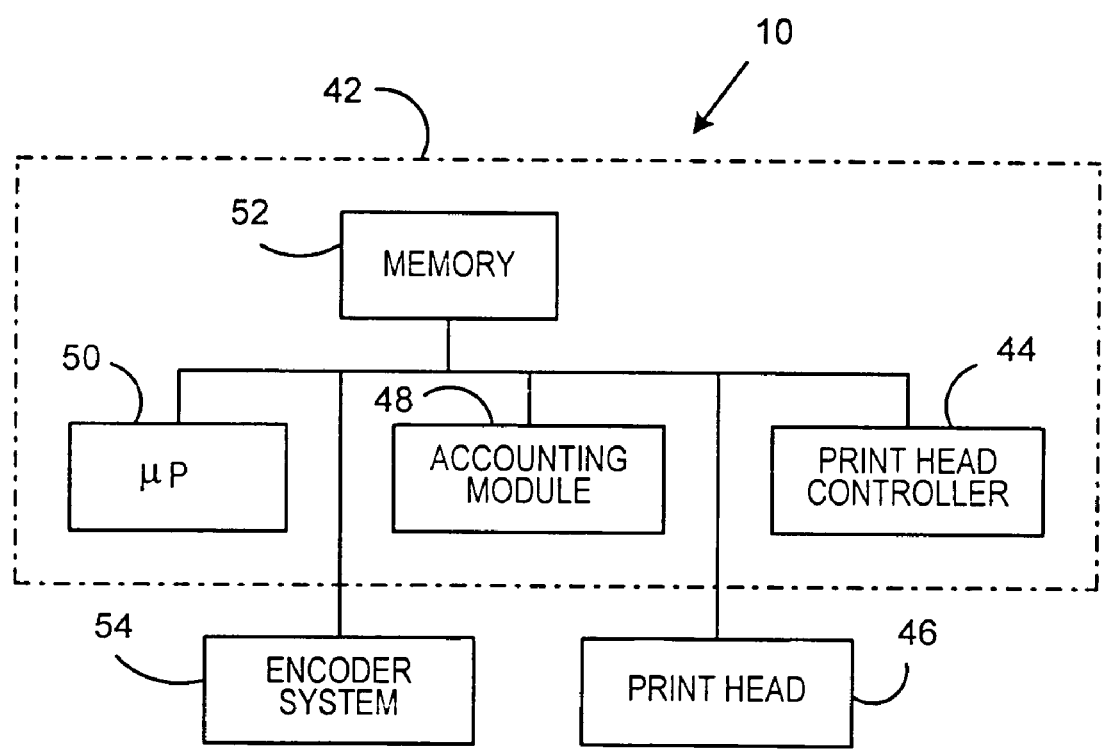
FIG. 2 is a block diagram showing certain components of the mail processing system of FIG. 1.

FIG. 2 is a block diagram showing certain components of mail processing system 10 according to the present invention. As seen in FIG. 2, mail processing system 10 includes micro control system 42, which may be of any suitable combination of microprocessors, firmware and software. The micro control system 42 includes a print head controller 44 having a suitable processor and memory which is in operative communication with ink jet print head 46, an accounting module 48 (e.g., a postage meter) for tracking postal funds, a microprocessor 50, and a memory 52. Ink jet print head 46 may be any type of ink jet print head (e.g., thermal (bubble) ink jet or piezoelectric ink jet). Additionally, the micro control system 42 is in operative communication with encoder system 54 for receiving signals indicating an appropriate change of state of encoder system 54, which in turn are used to generate firing pulses for ink jet print head 46. In response to the firing pulses, selected nozzles are activated, thereby ejecting ink. Those skilled in the art will recognize that the various components of the micro control system 42 are in operative communication with each other over conventional communication lines, such as a communication bus.

Figure 3:
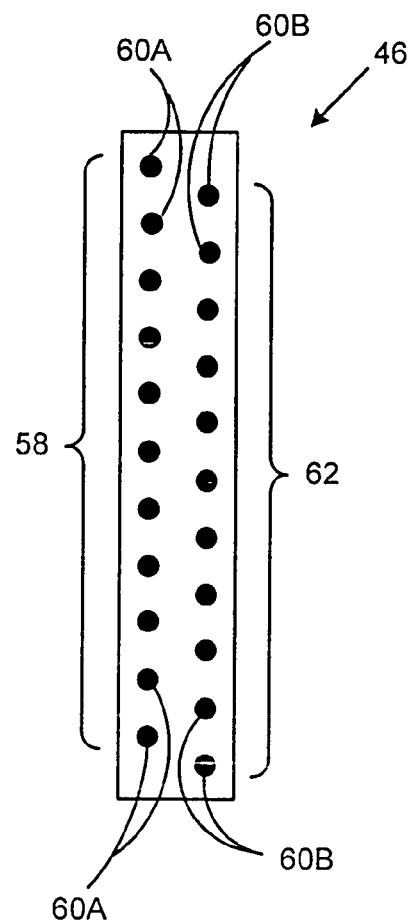
FIG. 3 is a schematic diagram of an ink jet print head forming part of the mail processing system of FIG. 1.

A schematic diagram of ink jet print head 46 is shown in FIG. 3. Ink jet print head 46 includes a first array 58 (commonly called the odd array) of nozzles 60A and a second array 62 (commonly called the even array) of nozzles 60B. Each nozzle 60A, 60B has a corresponding ejection element (not shown) for causing the ejection of a drop of ink. As seen in FIG. 3, nozzles 60A and 60B are spaced apart from another along the horizontal axis of ink jet print head 46 and alternate along the vertical axis of ink jet print head 46. As will be appreciated, the relative vertical spacing of the nozzles 60A and 60B determines the vertical printer resolution of ink jet print head 46.

Figure 4:
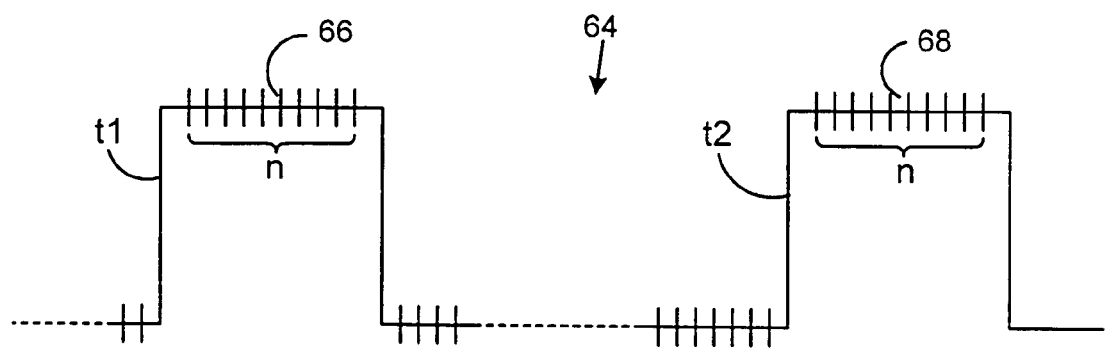
FIG. 4 is a schematic diagram of a clock line utilized to time the firing of the ink jet print head of FIG. 3.
Figure 5:
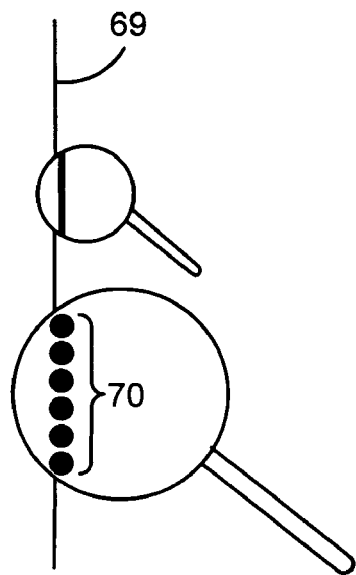
FIG. 5 is a schematic diagram showing a straight line printed with the ink jet print head of FIG. 3.

The firing of first array 58 and second array 62 is dependent on a clock line 64 shown in FIG. 4 that is generated by print head controller 44 of mail processing system 10 (FIG. 2). In particular, a clock line 64 is generated by print head controller 44 based on signals from encoder system 54 indicating that firing of ink jet print head 46 should commence. Clock line 64 includes a first plateau region 66 beginning at time t1 and a second plateau region 68 beginning at time t2. Plateau region 66 lasts for n cycles of a time based clock provided in print head controller 44 (preferably implemented in software, but possibly also implemented in hardware). Similarly, plateau region 68 also lasts for n cycles of the time based clock. In addition, through software control provided in print head controller 44, first array 58 may be fired (selected nozzles 60A fired) at time t1 or any $n^{th}$ interval along plateau region 66, and second array 62 may be fired (selected nozzles 60B fired) at time t2 or any $n^{th}$ interval along plateau region 68. In other words, clock line 64 (specifically plateaus 66 and 68) is addressable in n increments to cause the firing of either first array 58 or second array 62 at various points in time along clock line 64. Ink jet print head 46 is designed such that if first array 58 fires at time t1 and second array 62 fires at time t2 as the print medium is moved relative to the ink jet print head 46, a straight vertical line 69 will be produced by the resulting ink drops 70 as illustrated in FIG. 5.

Figure 6:
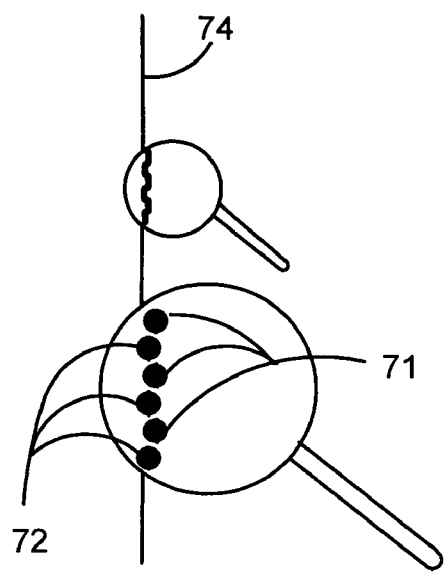
FIG. 6 is a schematic diagram showing a line having offset dots printed with the ink jet print head of FIG. 3.

Due to the addressable nature of clock line 64, it is possible to cause the dots produced from the firing of first array 58 to be offset with respect to the horizontal axis along which the print medium is moving from the dots produced from the firing of second array 62. For example, first array 58 may be fired at time t1 and second array 62 may be fired at some time after t2 along plateau 68 (at one of the n increments). As shown in FIG. 6, such a firing sequence will cause the dots 71 produced from the firing of first array 58 to be offset to the right of the dots 72 produced from the firing of second array 62. As will be appreciated, the dots 71 produced from the firing of first array 58 may be caused to be offset, with respect to the horizontal axis, to the left of the dots 72 produced from the firing of second array 62 by firing first array 58 at a point along plateau 66 (e.g., at one of the $n^{th}$ intervals) that is further along plateau 66 than the point on plateau 68 at which second array 62 is fired (e.g., t2). In addition, the extent of the offset, in either direction, can be selectively fine tuned depending upon the particular $n^{th}$ increments along plateaus 66 and 68 that are chosen for the firing of each array 58, 62.

Because ink jet print heads such as ink jet print head 46 are available with very high resolutions (e.g., on the order of 600 dpi or greater), the offsets described herein are able to be made very small, typically on the order of 0.0001 inches to 0.001 inches. As a result, the lines containing offset dots that are produced as described herein, such as line 74 shown in FIG. 6, will appear to be straight to the naked eye. In addition, the variations produced by such offsets are small enough that they will not adversely effect the ability of a bar code scanner or optical character recognition scanner (such as those used by the U.S. Postal Service to process mail in an automated manner) to properly read the image produced, which may be, for example, a postal indicium containing a 2-D bar code and other information. The offsets will only be able to be detected with forensic equipment under proper magnification, such as by using a microscope to view the lines or a very high resolution scanner to scan the lines and subsequently enlarge them for inspection.

According to an aspect of the present invention, the ability to selectively offset the dots produced by the firing of first array 58 from the dots produced by the firing of second array 62 may be used to embed information in an image, such as a postal indicium, that is printed by ink jet print head 46. Specifically, a variety of encoding schemes may be employed based on the relative offset of the dots produced by the firing of first array 58 from the dots produced by the firing of second array 62 to embed information in an image.

Figure 7:
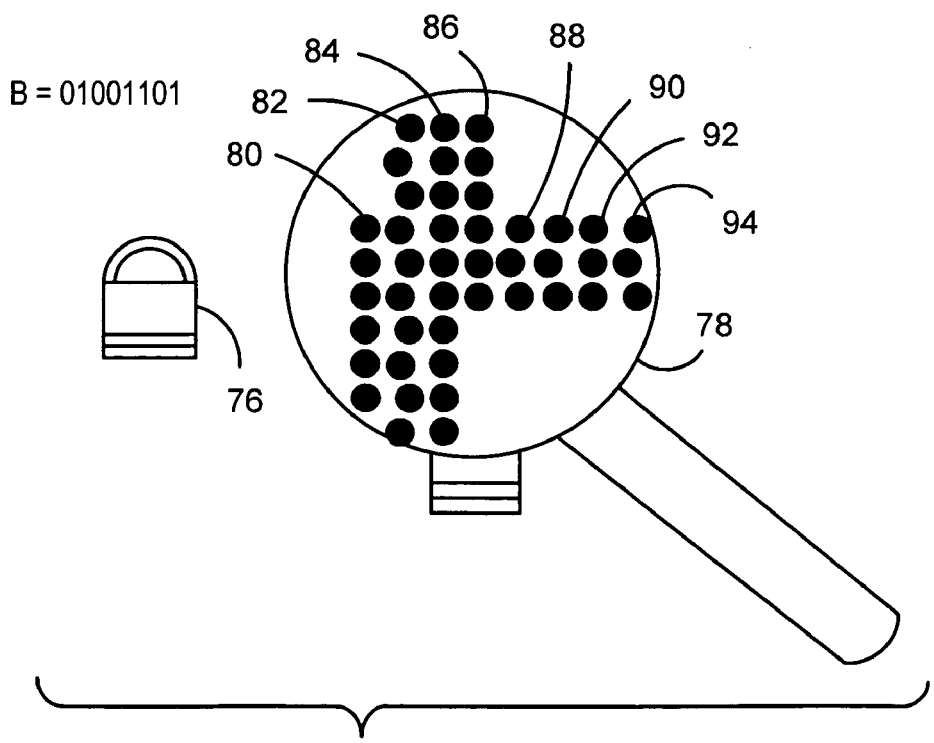
FIG. 7 is a schematic diagram showing an image printed with the ink jet print head of FIG. 3 that has information embedded therein according to the present invention.

According to one embodiment of the invention, a binary encoding scheme is used to embed information in images printed by ink jet print head 46. For example, in such a binary encoding scheme, a 0 can be represented by a line that is straight (dots not offset from one another), as seen in FIG. 5, and a 1 can be represented by a line that has detectable offsets, as seen in FIG. 6. FIG. 7 illustrates how such a binary encoding scheme may be used to embed data in an image 76 printed by ink jet print head 46. In particular, the data stream B=01001101 can be seen in the magnified portion 78 of image 76, wherein lines 80, 84, 86 and 92 represent 0s (they do not contain offsets), and lines 82, 88, 90, and 94 represent 1s (they contain offsets). The embedded information will be imperceptible to the naked eye, but may be recovered using forensic equipment with appropriate magnification. As will be appreciated, as an alternative, the roles of straight lines and offset lines may be switched in the encoding scheme such that a 1 is represented by a line that is straight (dots not offset from one another) and a 0 is represented by a line that has detectable offsets. As still another alternative, a 0 may be represented by a line wherein certain dots are offset a first distance, and a 1 may be represented by a line wherein certain dots are offset a second greater distance, and vice versa. As will be appreciated, the embodiment wherein a 0 or a 1 is represented by a straight line is actually a special case of this alternative embodiment wherein the first distance is zero.

In addition, as will be appreciated, any number of alternative encoding schemes may be employed to embed information into an image printed by ink jet print head 46 based on the relative position of the printed dots. For example, the encoding scheme need not be limited to a binary encoding scheme. Instead, an encoding scheme could be developed wherein each encoded value is represented by a line having a different degree of offset of the dots. For example, an encoding scheme having three values could be employed wherein the first value is represented by a straight line, the second value is represented by a line having dots offset by a first distance, e.g., 0.0001 inches, and the third value is represented by a line having dots offset by a second distance different than the first distance, e.g., 0.001 inches. It should be understood that the encoding schemes described herein are meant to be exemplary, and that many other types of encoding schemes based on dot position may be used within the scope of the present invention.

Embedding information in an image in the manner described herein can be used to detect copying and prevent fraud in, for example, applications such as the printing of postal indicia and tickets, among others. Because of the fine resolution of the image, which will contain dots offset by very small amounts as described above, printed images will not be able to be copied and/or scanned using most conventional copiers and scanners in a manner that preserves the embedded information because such conventional copiers and scanners simply do not have the resolution required to duplicate the offsets. Instead, the copies or scanned images will contain what appear to be straight lines as opposed to having any lines with particular offsets. In the case of a postal indicium, various types of information, including, without limitation, information taken from the indicium, all or part of the digital signature of the indicium, or a simple data stream with a check sum value, can be embedded in the postal indicium as described herein. Later, the authenticity of the indicium can be verified by recovering, using magnifying forensic equipment, and verifying the embedded information. As described above, if the indicium is copied or scanned and reprinted, the embedded information will not be able to be recovered from the copy or reprint and the indicium can be identified as fraudulent. The same principle applies to any other printed image, such as an image forming part of a ticket.

Figure 8:
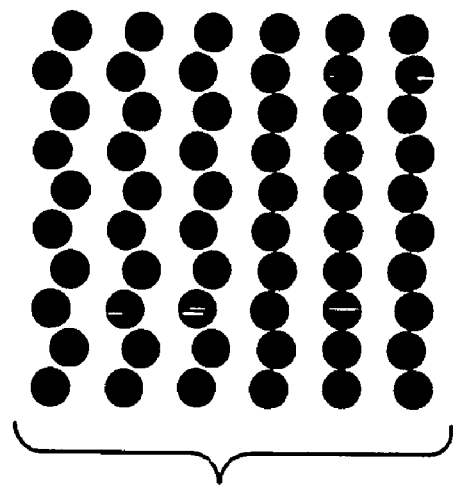
FIGS. 8 and 9 are schematic diagrams showing images printed with the ink jet print head of FIG. 3 that have gray level modulation.
Figure 9:
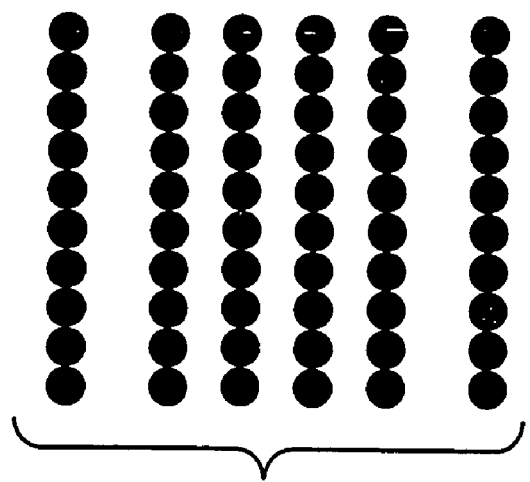

In addition, the ability to print dots having the finely spaced and selectively adjustable offsets as described herein enable the printing of images having varying degrees of gray level. For example, an image having lines arranged as shown in FIG. 8 will have a higher gray level on the left side as compared to the right side, and an image having lines arranged as shown in FIG. 9 will have a higher gray level in the middle as compared to the left and right sides. However, if the image is copied or scanned and reprinted, the duplicate version will in most cases not repeat the gray level modulation of the original due to the inability to duplicate the fine resolution, and therefore can be identified as fraudulent.

While preferred embodiments of the invention have been described and illustrated above, it should be understood that these are exemplary of the invention and are not to be considered as limiting. Additions, deletions, substitutions, and other modifications can be made without departing from the spirit or scope of the present invention. For example, while the method of the present invention has been described in connection with a mail processing system such as a mailing machine, the method may also be implemented in any other device that uses an ink jet print head and transports print media past the ink jet print head for printing. Accordingly, the invention is not to be considered as limited by the foregoing description but is only limited by the scope of the appended claims.

What is claimed is:

1. A method of embedding information in an image printed on a print medium using an ink jet print head during relative movement between said print medium and said ink jet print head along a horizontal axis comprising:
    printing a plurality of first lines along a vertical axis, each of said first lines including a plurality of first dots and a plurality of second dots, said second dots being offset from said first dots along said horizontal axis by a first amount; and
    printing a plurality of second lines along said vertical axis, each of said second lines including a plurality of third dots and a plurality of fourth dots, said fourth dots being offset from said third dots along said horizontal axis by a second amount different than said first amount;
    wherein said first lines represent a first value in an encoding scheme and said second lines represent a second value in said encoding scheme, and wherein said information is encoded in said image using said encoding scheme.

2. A method according to claim 1, wherein said encoding scheme is a binary encoding scheme and wherein said first lines represent 1s and said second vertical lines represent 0s.

3. A method according to claim 1, wherein said encoding scheme is a binary encoding scheme and wherein said first vertical lines represent 0s and said second lines represent 1s.

4. A method according to claim 1, wherein said print medium is a mail piece and said image is a postal indicium.

5. A method according to claim 1, further comprising:
    printing a plurality of third lines along said vertical axis, each of said third lines including a plurality of fifth dots and a plurality of sixth dots, said sixth dots being offset from said fifth dots along said horizontal axis by a third amount different than said first and second amounts, wherein said third lines represent a third value in said encoding scheme.

6. An apparatus for embedding information in an image printed on a print medium, comprising:
    an ink jet print head for printing said image during relative movement between said print medium and said ink jet print head along a horizontal axis;
    a processor; and
    a memory, said memory storing software executable by said processor, said software including instructions for:
    printing a plurality of first lines along a vertical axis, each of said first lines including a plurality of first dots and a plurality of second dots, said second dots being offset from said first dots along said horizontal axis by a first amount; and
    printing a plurality of second lines along said vertical axis, each of said second lines including a plurality of third dots and a plurality of fourth dots, said fourth dots being offset from said third dots along said horizontal axis by a second amount different than said first amount;
    wherein said first lines represent a first value in an encoding scheme and said second lines represent a second value in said encoding scheme, and wherein said information is encoded in said image using said encoding scheme.

7. An apparatus according to claim 6, wherein said encoding scheme is a binary encoding scheme and wherein said first lines represent 1s and said second lines represent 0s.

8. An apparatus according to claim 6, wherein said encoding scheme is a binary encoding scheme and wherein said first lines represent 0s and said second lines represent 1s.

9. An apparatus according to claim 6, wherein said apparatus is a mail processing system, said print medium is a mail piece, and said image is a postal indicium.

10. An apparatus according to claim 6, wherein said instructions further comprise instructions for printing a plurality of third lines along said vertical axis, each of said third lines including a plurality of fifth dots and a plurality of sixth dots, said sixth dots being offset from said fifth dots along said horizontal axis by a third amount different than said first and second amounts, wherein said third lines represent a third value in said encoding scheme.

11. An apparatus according to claim 6, wherein said ink jet print head comprises a first array of first nozzles oriented along said vertical axis and a second array of second nozzles oriented along said vertical axis, wherein said first and third dots are printed using a plurality of said first nozzles and said second and fourth dots are printed using a plurality of said second nozzles.

12. A method of embedding information in an image printed on a print medium using an ink jet print head during relative movement between said print medium and said ink jet print head along a horizontal axis comprising:
  printing a plurality of first lines along a vertical axis, each of said first lines including a plurality of first dots and a plurality of second dots, said second dots aligning with said first dots along said horizontal axis; and
  printing a plurality of second lines along said vertical axis, each of said second lines including a plurality of third dots and a plurality of fourth dots, said fourth dots being offset from said third dots along said horizontal axis;
  wherein said first lines represent a first value in an encoding scheme and said second lines represent a second value in said encoding scheme, and wherein said information is encoded in said image using said encoding scheme.

13. A method according to claim 12, wherein said encoding scheme is a binary encoding scheme and wherein said first lines represent 0s and said second lines represent 1s.

14. A method according to claim 12, wherein said encoding scheme is a binary encoding scheme and wherein said first lines represent 1s and said second lines represent 0s.

15. A method according to claim 12, wherein said print medium is a mail piece and said image is a postal indicium.

16. An apparatus for embedding information in an image printed on a print medium, comprising:
  an ink jet print head for printing said image during relative movement between said print medium and said ink jet print head along a horizontal axis;
  a processor; and
  a memory, said memory storing software executable by said processor, said software including instructions for:
    printing a plurality of first lines along a vertical axis, each of said first lines including a plurality of first dots and a plurality of second dots, said second dots being aligned with said first dots along said horizontal axis; and
    printing a plurality of second lines along said vertical axis, each of said second lines including a plurality of third dots and a plurality of fourth dots, said fourth dots being offset from said third dots along said horizontal axis;
  wherein said first lines represent a first value in an encoding scheme and said second lines represent a second value in said encoding scheme, and wherein said information is encoded in said image using said encoding scheme.

17. An apparatus according to claim 16, wherein said encoding scheme is a binary encoding scheme and wherein said first lines represent 0s and said second lines represent 1s.

18. An apparatus according to claim 16, wherein said encoding scheme is a binary encoding scheme and wherein said first lines represent 1s and said second lines represent 0s.

19. An apparatus according to claim 16, wherein said apparatus is a mail processing system, said print medium is a mail piece, and said image is a postal indicium.

20. An apparatus according to claim 16, wherein said ink jet print head comprises a first array of first nozzles oriented along said vertical axis and a second array of second nozzles oriented along said vertical axis, wherein said first and third dots are printed using a plurality of said first nozzles and said second and fourth dots are printed using a plurality of said second nozzles.

* * * * *